US010102082B2

(12) United States Patent
Cabrera et al.

(10) Patent No.: US 10,102,082 B2
(45) Date of Patent: Oct. 16, 2018

(54) METHOD AND SYSTEM FOR PROVIDING AUTOMATED SELF-HEALING VIRTUAL ASSETS

(71) Applicant: Intuit Inc., Mountain View, CA (US)

(72) Inventors: Luis Felipe Cabrera, Bellevue, WA (US); M. Shannon Lietz, San Marcos, CA (US)

(73) Assignee: Intuit Inc., Mountain View, CA (US)

( * ) Notice: Subject to any disclaimer, the term of this patent is extended or adjusted under 35 U.S.C. 154(b) by 440 days.

(21) Appl. No.: 14/448,326

(22) Filed: Jul. 31, 2014

(65) Prior Publication Data

US 2016/0034359 A1  Feb. 4, 2016

(51) Int. Cl.
  *G06F 11/14* (2006.01)
  *G06F 21/57* (2013.01)
  (Continued)

(52) U.S. Cl.
  CPC ...... *G06F 11/1464* (2013.01); *G06F 11/0709* (2013.01); *G06F 11/0793* (2013.01); *G06F 11/301* (2013.01); *G06F 11/3409* (2013.01); *G06F 21/568* (2013.01); *G06F 21/57* (2013.01); *H04L 63/14* (2013.01); *H04L 63/145* (2013.01); *H04L 63/1416* (2013.01);
  (Continued)

(58) Field of Classification Search
  CPC ............. G06F 11/0709; G06F 11/0793; G06F 11/1484; G06F 11/301; G06F 11/30; G06F 11/34; G06F 11/0712; G06F 11/3409; G06F 11/3428
  USPC ................................................ 714/47.2, 47.3
  See application file for complete search history.

(56) References Cited

U.S. PATENT DOCUMENTS 5,712,641 A  1/1998  Casabona et al.
5,731,991 A  3/1998  Kinra et al.
(Continued)

FOREIGN PATENT DOCUMENTS

| CN | 101374051 | 2/2009 |
| EP | 2 541 420 | 1/2013 |
| WO | WO 2002/091182 | 11/2002 |
| WO | WO 2009/079648 | 6/2009 |

(Continued)

OTHER PUBLICATIONS

"VMware Backdoor I/O Port," [online], [retrieved Sep. 2, 2015]. Retrieved from the internet. <URL: http://sites.google.com/site/chitchatvmback/backdoor>.

(Continued)

*Primary Examiner* — Elmira Mehrmanesh
(74) *Attorney, Agent, or Firm* — Hawley Troxell Ennis & Hawley LLP; Philip McKay

(57) ABSTRACT

A method and system for performing self-monitoring and self-healing operations from a virtual asset include receiving a first operating policy from an asset management computing environment, according to one embodiment. The method and system includes receiving a library of repairs from the asset management computing environment, according to one embodiment. The method and system includes detecting events, with the virtual asset, at least partially based on operational characteristics of the virtual asset exceeding at least one of the thresholds, according to one embodiment. The method and system includes repairing the virtual asset, with the virtual asset, using the library of repairs to return the virtual asset to the pre-determined state of operation.

31 Claims, 4 Drawing Sheets

(51) Int. Cl.
*G06F 21/56* (2013.01)
*H04L 29/06* (2006.01)
*G06F 11/30* (2006.01)
*G06F 11/34* (2006.01)
*G06F 11/07* (2006.01)
*G06F 9/455* (2018.01)

(52) U.S. Cl.
CPC .............................. *G06F 11/1484* (2013.01); *G06F 2009/45591* (2013.01); *G06F 2201/805* (2013.01); *G06F 2201/81* (2013.01); *G06F 2201/815* (2013.01)

(56) References Cited

U.S. PATENT DOCUMENTS

| | | | |
|---|---|---|---|
| 6,085,224 A | 7/2000 | Wagner | |
| 6,178,452 B1 * | 1/2001 | Miyamoto | G06F 11/1458 709/223 |
| 6,202,066 B1 | 3/2001 | Barkley et al. | |
| 6,205,552 B1 | 3/2001 | Fudge | |
| 6,321,338 B1 | 11/2001 | Porras et al. | |
| 6,343,236 B1 | 1/2002 | Gibson et al. | |
| 6,549,932 B1 | 4/2003 | McNally et al. | |
| 6,651,183 B1 | 11/2003 | Gensler et al. | |
| 7,055,062 B2 * | 5/2006 | Shah | G05B 23/0224 714/15 |
| 7,114,183 B1 | 9/2006 | Joiner | |
| 7,228,438 B2 | 6/2007 | Bushmitch et al. | |
| 7,296,261 B2 | 11/2007 | Witchel et al. | |
| 7,373,524 B2 | 5/2008 | Motsinger et al. | |
| 7,426,745 B2 | 9/2008 | McCarty | |
| 7,437,764 B1 | 10/2008 | Sobel et al. | |
| 7,506,371 B1 | 3/2009 | Ben-Natan | |
| 7,552,424 B1 | 6/2009 | Bischof et al. | |
| 7,574,746 B2 | 8/2009 | Hill et al. | |
| 7,577,722 B1 | 8/2009 | Khandekar et al. | |
| 7,596,625 B2 | 9/2009 | Manion et al. | |
| 7,600,153 B2 * | 10/2009 | Cabrera | G06F 11/1402 714/15 |
| 7,640,458 B2 | 12/2009 | Rao et al. | |
| 7,761,923 B2 | 7/2010 | Khuti et al. | |
| 7,779,247 B2 | 8/2010 | Roegner | |
| 7,788,235 B1 | 8/2010 | Yeo | |
| 7,792,256 B1 | 9/2010 | Arledge et al. | |
| 7,831,570 B2 | 11/2010 | Sack et al. | |
| 7,925,527 B1 | 4/2011 | Flam | |
| 7,925,923 B1 | 4/2011 | Hyser et al. | |
| 7,934,229 B1 | 4/2011 | Vogel | |
| 7,944,355 B2 | 5/2011 | Kumar et al. | |
| 7,996,836 B1 | 8/2011 | McCorkendale et al. | |
| 8,001,422 B1 | 8/2011 | Sun et al. | |
| 8,095,962 B2 | 1/2012 | Condon | |
| 8,108,855 B2 * | 1/2012 | Dias | G06F 8/60 709/203 |
| 8,132,231 B2 | 3/2012 | Amies et al. | |
| 8,161,475 B2 * | 4/2012 | Araujo, Jr. | G06F 9/455 709/224 |
| 8,171,485 B2 | 5/2012 | Muller | |
| 8,171,554 B2 | 5/2012 | Elovici et al. | |
| 8,181,036 B1 | 5/2012 | Nachenberg | |
| 8,266,670 B1 | 9/2012 | Merkow et al. | |
| 8,281,399 B1 | 10/2012 | Chen et al. | |
| 8,312,516 B1 | 11/2012 | Malatesta | |
| 8,327,373 B2 * | 12/2012 | Srinivasan | G06F 9/5005 709/226 |
| 8,341,625 B2 | 12/2012 | Ferris et al. | |
| 8,347,281 B2 | 1/2013 | Arsenault et al. | |
| 8,392,496 B2 | 3/2013 | Linden et al. | |
| 8,438,643 B2 | 5/2013 | Wiemer et al. | |
| 8,510,821 B1 | 8/2013 | Brandwine et al. | |
| 8,555,388 B1 | 10/2013 | Wang et al. | |
| 8,561,126 B2 | 10/2013 | Ananthanarayanan et al. | |
| 8,561,127 B1 | 10/2013 | Agrawal et al. | |
| 8,572,733 B1 | 10/2013 | Rockwood | |
| 8,615,785 B2 | 12/2013 | Elrod et al. | |
| 8,621,618 B1 | 12/2013 | Ramsey et al. | |
| 8,639,923 B2 | 1/2014 | Lo et al. | |
| 8,656,482 B1 | 2/2014 | Tosa et al. | |
| 8,683,585 B1 | 3/2014 | Chen et al. | |
| 8,688,820 B1 | 4/2014 | Bhogi et al. | |
| 8,726,383 B2 | 5/2014 | Blackwell | |
| 8,776,050 B2 | 7/2014 | Plouffe et al. | |
| 8,799,431 B2 | 8/2014 | Pabari | |
| 8,813,225 B1 | 8/2014 | Fuller et al. | |
| 8,863,284 B1 | 10/2014 | Polyakov et al. | |
| 8,918,785 B1 | 12/2014 | Brandwine et al. | |
| 8,959,633 B1 | 2/2015 | Dokey et al. | |
| 8,990,935 B1 | 3/2015 | Cutts | |
| 9,047,582 B2 | 6/2015 | Hutchinson et al. | |
| 9,049,105 B1 | 6/2015 | Feinstein et al. | |
| 9,112,841 B1 | 8/2015 | Brandwine et al. | |
| 9,215,153 B2 * | 12/2015 | DeLuca | H04L 43/08 |
| 9,270,690 B2 | 2/2016 | Kraitsman et al. | |
| 9,459,987 B2 | 10/2016 | Weaver et al. | |
| 2002/0066034 A1 | 5/2002 | Schlossberg et al. | |
| 2002/0099992 A1 | 7/2002 | Distler et al. | |
| 2002/0116404 A1 | 8/2002 | Cha et al. | |
| 2002/0138416 A1 | 9/2002 | Lovejoy et al. | |
| 2002/0147803 A1 | 10/2002 | Dodd et al. | |
| 2002/0156904 A1 | 10/2002 | Gullotta et al. | |
| 2003/0037263 A1 | 2/2003 | Kamat et al. | |
| 2003/0046128 A1 | 3/2003 | Heinrich | |
| 2003/0051154 A1 | 3/2003 | Barton et al. | |
| 2003/0084327 A1 | 5/2003 | Lingafelt et al. | |
| 2003/0088791 A1 | 5/2003 | Porras et al. | |
| 2003/0110392 A1 | 6/2003 | Aucsmith et al. | |
| 2003/0188191 A1 | 10/2003 | Aaron et al. | |
| 2003/0195959 A1 | 10/2003 | Labadie et al. | |
| 2003/0233438 A1 | 12/2003 | Hutchinson et al. | |
| 2004/0006704 A1 | 1/2004 | Dahlstrom et al. | |
| 2004/0010571 A1 | 1/2004 | Hutchinson et al. | |
| 2004/0044891 A1 | 3/2004 | Hanzlik et al. | |
| 2004/0181775 A1 | 9/2004 | Anonsen et al. | |
| 2004/0237093 A1 | 11/2004 | Sluiman et al. | |
| 2004/0249973 A1 | 12/2004 | Alkhatib et al. | |
| 2004/0249974 A1 | 12/2004 | Alkhatib et al. | |
| 2005/0018618 A1 | 1/2005 | Mualem et al. | |
| 2005/0066309 A1 | 3/2005 | Creamer et al. | |
| 2005/0091304 A1 | 4/2005 | Trayler | |
| 2005/0108571 A1 | 5/2005 | Lu et al. | |
| 2005/0114836 A1 | 5/2005 | Fu | |
| 2005/0155013 A1 | 7/2005 | Carrigan | |
| 2005/0172162 A1 | 8/2005 | Takahashi et al. | |
| 2005/0182969 A1 | 8/2005 | Ginter et al. | |
| 2005/0183138 A1 | 8/2005 | Phillips et al. | |
| 2005/0188222 A1 | 8/2005 | Motsinger et al. | |
| 2005/0193231 A1 | 9/2005 | Scheuren | |
| 2005/0193269 A1 | 9/2005 | Haswell et al. | |
| 2005/0204151 A1 | 9/2005 | Fang et al. | |
| 2005/0278790 A1 | 12/2005 | Birk et al. | |
| 2006/0031407 A1 | 2/2006 | Dispensa et al. | |
| 2006/0037077 A1 | 2/2006 | Gadde et al. | |
| 2006/0064740 A1 | 3/2006 | Kelley et al. | |
| 2006/0090206 A1 | 4/2006 | Ladner et al. | |
| 2006/0101519 A1 | 5/2006 | Lasswell et al. | |
| 2006/0101520 A1 | 5/2006 | Schumaker et al. | |
| 2006/0117209 A1 | 6/2006 | Drouet et al. | |
| 2006/0136720 A1 * | 6/2006 | Armstrong | G06F 21/53 713/164 |
| 2006/0184838 A1 | 8/2006 | Singonahalli et al. | |
| 2006/0195745 A1 | 8/2006 | Keromytis et al. | |
| 2006/0203739 A1 | 9/2006 | Padmanabhan et al. | |
| 2006/0248573 A1 | 11/2006 | Pannu et al. | |
| 2006/0272018 A1 | 11/2006 | Fouant | |
| 2006/0293940 A1 | 12/2006 | Tsyganskiy et al. | |
| 2007/0006304 A1 | 1/2007 | Kramer et al. | |
| 2007/0027999 A1 | 2/2007 | Allen et al. | |
| 2007/0043860 A1 | 2/2007 | Pabari | |
| 2007/0079168 A1 | 4/2007 | Sivakumar et al. | |
| 2007/0094711 A1 | 4/2007 | Corley et al. | |
| 2007/0101400 A1 | 5/2007 | Freeman et al. | |
| 2007/0157311 A1 | 7/2007 | Meier et al. | |
| 2007/0169204 A1 | 7/2007 | Janakiraman et al. | |
| 2007/0180509 A1 | 8/2007 | Swartz et al. | |

(56) References Cited

U.S. PATENT DOCUMENTS

| | | |
|---|---|---|
| 2007/0185875 A1 | 8/2007 | Chang et al. |
| 2007/0204346 A1 | 8/2007 | Meier |
| 2007/0250424 A1 | 10/2007 | Kothari |
| 2008/0016570 A1 | 1/2008 | Capalik |
| 2008/0025288 A1 | 1/2008 | Benner et al. |
| 2008/0044018 A1 | 2/2008 | Scrimsher et al. |
| 2008/0141332 A1 | 6/2008 | Treinen |
| 2008/0148398 A1 | 6/2008 | Mezack et al. |
| 2008/0177691 A1 | 7/2008 | Alperovitch et al. |
| 2008/0184079 A1 | 7/2008 | Merriman et al. |
| 2008/0244744 A1 | 10/2008 | Thomas et al. |
| 2008/0256639 A1 | 10/2008 | Onoda et al. |
| 2008/0262990 A1 | 10/2008 | Kapoor et al. |
| 2008/0263670 A1 | 10/2008 | Stavrica |
| 2008/0295076 A1 | 11/2008 | McKain et al. |
| 2008/0307525 A1 | 12/2008 | Nickle |
| 2009/0007100 A1 | 1/2009 | Field et al. |
| 2009/0007264 A1 | 1/2009 | Chatterjee et al. |
| 2009/0049553 A1 | 2/2009 | Vasudeva |
| 2009/0083695 A1 | 3/2009 | Mir et al. |
| 2009/0089682 A1 | 4/2009 | Baier et al. |
| 2009/0089860 A1 | 4/2009 | Forrester et al. |
| 2009/0106838 A1 | 4/2009 | Clark et al. |
| 2009/0172788 A1 | 7/2009 | Vedula et al. |
| 2009/0177717 A1 | 7/2009 | Meehan et al. |
| 2009/0199273 A1 | 8/2009 | Yalamanchi |
| 2009/0205039 A1 | 8/2009 | Ormazabal et al. |
| 2009/0228973 A1* | 9/2009 | Kumar ............... H04L 63/0272 726/15 |
| 2009/0254970 A1 | 10/2009 | Agarwal et al. |
| 2009/0254990 A1 | 10/2009 | McGee |
| 2009/0288078 A1 | 11/2009 | Makonahalli et al. |
| 2009/0293056 A1* | 11/2009 | Ferris ................... G06F 9/5077 718/1 |
| 2009/0300045 A1 | 12/2009 | Chaudhry et al. |
| 2009/0300423 A1 | 12/2009 | Ferris |
| 2009/0319527 A1 | 12/2009 | King et al. |
| 2010/0020700 A1 | 1/2010 | Kailash et al. |
| 2010/0030544 A1 | 2/2010 | Gopalan et al. |
| 2010/0030878 A1 | 2/2010 | Grabowski et al. |
| 2010/0042734 A1 | 2/2010 | Olafsson et al. |
| 2010/0057660 A1 | 3/2010 | Kato |
| 2010/0070964 A1 | 3/2010 | Blumfield et al. |
| 2010/0076987 A1 | 3/2010 | Schreiner |
| 2010/0077203 A1 | 3/2010 | Ogawa et al. |
| 2010/0122317 A1 | 5/2010 | Yadav |
| 2010/0175108 A1 | 7/2010 | Protas |
| 2010/0192220 A1 | 7/2010 | Heizmann et al. |
| 2010/0199351 A1 | 8/2010 | Protas |
| 2010/0212010 A1 | 8/2010 | Stringer et al. |
| 2010/0217850 A1 | 8/2010 | Ferris |
| 2010/0235828 A1 | 9/2010 | Nishimura et al. |
| 2010/0251363 A1 | 9/2010 | Todorovic |
| 2010/0257267 A1 | 10/2010 | Sohn et al. |
| 2010/0257580 A1 | 10/2010 | Zhao |
| 2010/0257599 A1 | 10/2010 | Gleichauf |
| 2010/0269121 A1 | 10/2010 | Montesissa et al. |
| 2010/0287530 A1 | 11/2010 | MacLean et al. |
| 2010/0306268 A1 | 12/2010 | Bhatti et al. |
| 2010/0306354 A1 | 12/2010 | DeHaan et al. |
| 2010/0306772 A1 | 12/2010 | Arnold et al. |
| 2010/0318481 A1 | 12/2010 | Feynman |
| 2011/0029957 A1 | 2/2011 | Shufer et al. |
| 2011/0034182 A1 | 2/2011 | Issa et al. |
| 2011/0040825 A1 | 2/2011 | Ramzan et al. |
| 2011/0047621 A1 | 2/2011 | Brando et al. |
| 2011/0055921 A1 | 3/2011 | Narayanaswamy et al. |
| 2011/0067097 A1 | 3/2011 | Park et al. |
| 2011/0101109 A1 | 5/2011 | Bona et al. |
| 2011/0107398 A1 | 5/2011 | Earl et al. |
| 2011/0138382 A1 | 6/2011 | Hauser et al. |
| 2011/0138469 A1 | 6/2011 | Ye et al. |
| 2011/0145657 A1 | 6/2011 | Bishop et al. |
| 2011/0154324 A1 | 6/2011 | Pagan et al. |
| 2011/0167494 A1 | 7/2011 | Bowen et al. |
| 2011/0197065 A1 | 8/2011 | Stauth et al. |
| 2011/0208677 A1 | 8/2011 | Zhou et al. |
| 2011/0208797 A1 | 8/2011 | Kim |
| 2011/0238855 A1 | 9/2011 | Korsunsky et al. |
| 2011/0258692 A1 | 10/2011 | Morrison et al. |
| 2011/0302415 A1 | 12/2011 | Ahmad et al. |
| 2012/0005750 A1 | 1/2012 | Satish |
| 2012/0011510 A1* | 1/2012 | Yamakabe ............ G06F 9/5072 718/1 |
| 2012/0039336 A1 | 2/2012 | Richmond et al. |
| 2012/0042362 A1 | 2/2012 | Vlasov et al. |
| 2012/0060207 A1 | 3/2012 | Mardikar et al. |
| 2012/0072985 A1 | 3/2012 | Davne et al. |
| 2012/0110672 A1 | 5/2012 | Judge et al. |
| 2012/0117654 A1 | 5/2012 | Yalakanti |
| 2012/0137367 A1 | 5/2012 | Dupont et al. |
| 2012/0144489 A1 | 6/2012 | Jarrett et al. |
| 2012/0151488 A1 | 6/2012 | Arcese et al. |
| 2012/0151553 A1 | 6/2012 | Burgess et al. |
| 2012/0167167 A1 | 6/2012 | Kruger et al. |
| 2012/0185390 A1 | 7/2012 | Palnitkar et al. |
| 2012/0185913 A1 | 7/2012 | Martinez et al. |
| 2012/0209947 A1 | 8/2012 | Glaser et al. |
| 2012/0210437 A1 | 8/2012 | Karande et al. |
| 2012/0233668 A1 | 9/2012 | Leafe et al. |
| 2012/0240193 A1 | 9/2012 | Littlefield et al. |
| 2012/0266167 A1 | 10/2012 | Spiers et al. |
| 2012/0291094 A9 | 11/2012 | Forrester et al. |
| 2012/0303776 A1 | 11/2012 | Ferris |
| 2012/0304300 A1 | 11/2012 | LaBumbard |
| 2012/0311016 A1 | 12/2012 | DeAnna et al. |
| 2012/0311157 A1 | 12/2012 | Erickson et al. |
| 2012/0311387 A1 | 12/2012 | Santhosh et al. |
| 2012/0324446 A1 | 12/2012 | Fries et al. |
| 2012/0324572 A1 | 12/2012 | Gordon et al. |
| 2012/0324576 A1 | 12/2012 | Clark et al. |
| 2013/0019242 A1 | 1/2013 | Chen et al. |
| 2013/0019314 A1 | 1/2013 | Ji et al. |
| 2013/0046667 A1 | 2/2013 | Hill et al. |
| 2013/0054792 A1 | 2/2013 | Sharaf |
| 2013/0055246 A1 | 2/2013 | Li et al. |
| 2013/0055398 A1 | 2/2013 | Li et al. |
| 2013/0067067 A1 | 3/2013 | Miri et al. |
| 2013/0091376 A1 | 4/2013 | Raspudic et al. |
| 2013/0097316 A1 | 4/2013 | Bender et al. |
| 2013/0097701 A1 | 4/2013 | Moyle et al. |
| 2013/0104237 A1 | 4/2013 | Riley et al. |
| 2013/0117567 A1 | 5/2013 | Chang et al. |
| 2013/0117809 A1 | 5/2013 | McDougal et al. |
| 2013/0117852 A1 | 5/2013 | Stute |
| 2013/0124712 A1 | 5/2013 | Parker |
| 2013/0125121 A1 | 5/2013 | White |
| 2013/0132854 A1 | 5/2013 | Raleigh et al. |
| 2013/0132950 A1 | 5/2013 | McLeod et al. |
| 2013/0133072 A1 | 5/2013 | Kraitsman et al. |
| 2013/0160072 A1 | 6/2013 | Reus et al. |
| 2013/0174259 A1 | 7/2013 | Pearcy et al. |
| 2013/0185795 A1 | 7/2013 | Winn et al. |
| 2013/0227695 A1 | 8/2013 | Shankar |
| 2013/0238786 A1 | 9/2013 | Khesin |
| 2013/0247133 A1 | 9/2013 | Price et al. |
| 2013/0247135 A1 | 9/2013 | Kundu et al. |
| 2013/0247206 A1 | 9/2013 | Hugard et al. |
| 2013/0247207 A1 | 9/2013 | Hugard et al. |
| 2013/0263209 A1 | 10/2013 | Panuganty |
| 2013/0263226 A1 | 10/2013 | Sudia |
| 2013/0276108 A1 | 10/2013 | Blackwell |
| 2013/0276152 A1 | 10/2013 | Hirsch et al. |
| 2013/0290694 A1 | 10/2013 | Civilini et al. |
| 2013/0291068 A1 | 10/2013 | Huang et al. |
| 2013/0291087 A1 | 10/2013 | Kailash et al. |
| 2013/0304693 A1 | 11/2013 | Jaeger et al. |
| 2013/0305357 A1 | 11/2013 | Ayyagari et al. |
| 2013/0305369 A1 | 11/2013 | Karta et al. |
| 2013/0305371 A1 | 11/2013 | Figlin et al. |
| 2013/0318599 A1 | 11/2013 | Fadida et al. |
| 2013/0326580 A1 | 12/2013 | Barclay et al. |
| 2013/0333040 A1 | 12/2013 | Diehl et al. |
| 2013/0339514 A1 | 12/2013 | Crank et al. |

(56) References Cited

U.S. PATENT DOCUMENTS

| | | |
|---|---|---|
| 2013/0343207 A1 | 12/2013 | Cook et al. |
| 2013/0346596 A1 | 12/2013 | Balakrishnan et al. |
| 2013/0347131 A1 | 12/2013 | Mooring et al. |
| 2014/0013452 A1 | 1/2014 | Aissi et al. |
| 2014/0026122 A1 | 1/2014 | Markande et al. |
| 2014/0026179 A1 | 1/2014 | Devarajan et al. |
| 2014/0026231 A1 | 1/2014 | Barak et al. |
| 2014/0033200 A1 | 1/2014 | Tompkins |
| 2014/0040299 A1 | 2/2014 | Datla et al. |
| 2014/0047546 A1 | 2/2014 | Sidagni |
| 2014/0068784 A1 | 3/2014 | Merkow et al. |
| 2014/0074799 A1 | 3/2014 | Karampuri et al. |
| 2014/0082621 A1 | 3/2014 | Fitzgerald et al. |
| 2014/0082733 A1 | 3/2014 | Benefield |
| 2014/0089204 A1 | 3/2014 | Spies et al. |
| 2014/0096134 A1* | 4/2014 | Barak .............. G06F 9/45558 718/1 |
| 2014/0109192 A1 | 4/2014 | Pidault et al. |
| 2014/0115578 A1 | 4/2014 | Cooper et al. |
| 2014/0165130 A1 | 6/2014 | Zaitsev |
| 2014/0172806 A1 | 6/2014 | Wilding |
| 2014/0173738 A1 | 6/2014 | Condry et al. |
| 2014/0189090 A1 | 7/2014 | Mikkilineni |
| 2014/0189680 A1 | 7/2014 | Kripalani |
| 2014/0196104 A1 | 7/2014 | Chari et al. |
| 2014/0196115 A1 | 7/2014 | Pelykh |
| 2014/0201836 A1 | 7/2014 | Amsler |
| 2014/0214460 A1 | 7/2014 | Rahnama |
| 2014/0258446 A1 | 9/2014 | Bursell |
| 2014/0258715 A1 | 9/2014 | Rodniansky |
| 2014/0259169 A1 | 9/2014 | Harrison |
| 2014/0282840 A1 | 9/2014 | Guinan |
| 2014/0282889 A1 | 9/2014 | Ishaya et al. |
| 2014/0289854 A1 | 9/2014 | Mahvi |
| 2014/0317737 A1 | 10/2014 | Shin et al. |
| 2014/0344933 A1 | 11/2014 | Huh et al. |
| 2014/0359259 A1 | 12/2014 | Ali et al. |
| 2015/0032587 A1 | 1/2015 | Broom et al. |
| 2015/0033340 A1 | 1/2015 | Giokas |
| 2015/0052108 A1 | 2/2015 | Volk et al. |
| 2015/0052402 A1 | 2/2015 | Gurumurthy et al. |
| 2015/0052520 A1* | 2/2015 | Crowell .............. G06F 21/566 718/1 |
| 2015/0067865 A1 | 3/2015 | Seacat Deluca et al. |
| 2015/0082307 A1 | 3/2015 | Bell et al. |
| 2015/0095691 A1 | 4/2015 | Edwards |
| 2015/0106939 A1* | 4/2015 | Lietz .................. H04L 63/1433 726/25 |
| 2015/0120928 A1 | 4/2015 | Gummaraju et al. |
| 2015/0128246 A1 | 5/2015 | Feghali et al. |
| 2015/0128274 A1 | 5/2015 | Giokas |
| 2015/0150123 A1 | 5/2015 | Be'ery |
| 2015/0229661 A1 | 8/2015 | Balabine et al. |
| 2015/0371044 A1 | 12/2015 | Horne et al. |
| 2016/0092535 A1 | 3/2016 | Kuchibhotla et al. |
| 2016/0098340 A1 | 4/2016 | Weaver et al. |
| 2016/0234167 A1 | 8/2016 | Engel et al. |
| 2016/0371178 A1 | 12/2016 | Bishop et al. |

FOREIGN PATENT DOCUMENTS

| | | |
|---|---|---|
| WO | WO 2012/023657 | 2/2012 |
| WO | WO 2012/135192 | 10/2012 |
| WO | WO 2013/067404 | 5/2013 |
| WO | WO 2013/123548 | 8/2013 |
| WO | WO 2015/102776 | 7/2015 |

OTHER PUBLICATIONS

"What is the Virtual Machine Backdoor," [online], [retrieved Sep. 2, 2015]. Retrieved from the internet. <URL: http://communities.vmware.com/thread/228415?start=0&start=0>.

Gryb et al., "Method and System for Validating a Virtual Asset," U.S. Appl. No. 14/070,050, filed Nov. 1, 2013.

Weaver et al., "Method and System for Providing and Dynamically Deploying Hardened Task Specific Virtual Hosts," U.S. Appl. No. 14/070,124, filed Nov. 1, 2013.

Cabrera et al., "Method and System for Dynamically and Automatically Managing Resource Access Permissions," U.S. Appl. No. 14/078,715, filed Nov. 13, 2013.

Cabrera et al., "Method and System for Providing a Robust and Efficient Virtual Asset Vulnerability Management and Verification Service," U.S. Appl. No. 14/186,801, filed Feb. 21, 2014.

Lietz et al., "Method and System for Providing an Efficient Vulnerability Management and Verification Service," U.S. Appl. No. 14/192,529, filed Feb. 27, 2014.

Lietz et al., "Method and System for Providing Temporary Secure Access Enabled Virtual Assets," U.S. Appl. No. 14/217,653, filed Mar. 18, 2014.

Lietz et al., "Method and System for Correlating Self-Reporting Virtual Asset Data with External Events to Generate an External Event Identification Database," U.S. Appl. No. 14/448,405, filed Jul. 31, 2014.

Lietz et al., "Method and System for Dynamic and Comprehensive Vulnerability Management," U.S. Appl. No. 14/052,971, filed Oct. 14, 2013.

Lietz et al., "Method and System for Creating and Dynamically Deploying Resource Specific Discovery Agents for Determining the State of a Cloud Computing Environment," U.S. Appl. No. 14/079,425, filed Nov. 13, 2013.

Lietz et al., "Method and System for Creating Enriched Log Data," U.S. Appl. No. 14/139,449, filed Dec. 23, 2013.

Cabrera et al., "Method and System for Intrusion and Extrusion Detection," U.S. Appl. No. 14/143,999, filed Dec. 30, 2013.

Cabrera et al., "Method and System for Extrusion and Intrusion Detection in a Cloud Computing Environment Using Network Communications Devices," U.S. Appl. No. 14/166,116, filed Jan. 28, 2014.

Cabrera et al., "Method and System for Extrusion and Intrusion Detection in a Cloud Computing Environment," U.S. Appl. No. 14/171,388, filed Feb. 3, 2014.

Lietz et al., "Method and System for Virtual Asset Assisted Extrusion and Intrusion Detection in a Cloud Computing Environment," U.S. Appl. No. 14/171,438, filed Feb. 3, 2014.

Bishop et al., "Method and System for Testing Cloud Based Applications in a Production Environment Using Fabricated User Data," U.S. Appl. No. 14/222,279, filed Mar. 21, 2014.

Weaver et al., "Method and System for Comparing Different Versions of a Cloud Based Application in a Production Environment Using Segregated Backend Systems," U.S. Appl. No. 14/231,141, filed Mar. 31, 2014.

Brinkley et al., "Method and System for Testing Cloud Based Applications and Services in a Production Environment Using Segregated Backend Systems," U.S. Appl. No. 14/231,253, filed Mar. 31, 2014.

Lietz et al., "Method and System for Providing Security Aware Applications," U.S. Appl. No. 14/247,131, filed Apr. 7, 2014.

Cabrera et al., Method and System for Providing Self-Monitoring, Self-Reporting, and Self-Repairing Virtual Assets in a Cloud Computing Environment, U.S. Appl. No. 14/256,289, filed Apr. 18, 2014.

Bishop et al., "Method and System for Ensuring an Application Conforms with Security and Regulatory Controls Prior to Deployment," U.S. Appl. No. 14/261,621, filed Apr. 25, 2014.

Lietz et al., "Method and System for Detecting Irregularities and Vulnerabilities in Dedicated Hosting Environments," U.S. Appl. No. 14/266,018, filed Apr. 30, 2014.

Lietz et al., "Method and System for Providing Reference Architecture Pattern-Based Permissions Management," U.S. Appl. No. 14/266,107, filed Apr. 30, 2014.

Cabrera et al., "Method and Apparatus for Automating the Building of Threat Models for the Public Cloud," U.S. Appl. No. 14/288,260, filed May 27, 2014.

Bonney et al., "Method and System for Implementing Data Security Policies Using Database Classification," U.S. Appl. No. 14/289,817, filed May 29, 2014.

(56) References Cited

OTHER PUBLICATIONS

Lietz et al., "Method and System for Secure Delivery of Information to Computing Environments," U.S. Appl. No. 14/319,286, filed Jun. 30, 2014.
Cabrera et al., "Method and System for Efficient Management of Security Threats in a Distributed Computing Environment," U.S. Appl. No. 14/319,352, filed Jun. 30, 2014.
Lietz et al., "Method and System for Providing a Virtual Asset Perimeter," U.S. Appl. No. 14/448,281, filed Jul. 31, 2014.
Schwarzkopf et al., "Increasing Virtual Machine Security in Cloud Environments," *Journal of Cloud Computing: Advances, Systems and Applications*, Jul. 2012, pp. 1-12.
Tupakula, et al.; "Security Techniques for Zero Day Attacks;" Proceedings of the 7th International Wireless Communications and Mobile Computing Conference; Jul. 4-8, 2011; IEEE.
Tupakula, et al.; "Intrusion Detection Techniques for Infrastructure as a Service Cloud;" 2011 IEEE Ninth International Conference on Dependable, Autonomic and Secure Computing; Dec. 12-14, 2011; IEEE.

\* cited by examiner

METHOD AND SYSTEM FOR PROVIDING AUTOMATED SELF-HEALING VIRTUAL ASSETS

BACKGROUND

In a network, a central computing system can be configured to monitor tens, hundreds, or thousands of remote computing systems to ensure proper operation of the remote computing systems. However, configuring a single central computing system to provide diagnostic and repair services for multiple remote computing systems can result in a service bottleneck at the central computing system. For example, if a particular problem simultaneously affects hundreds of remote computing systems, the central computing system would potentially be tasked with concurrently scanning each of the affected systems and transmitting fixes to each of the affected systems. The service bottleneck would manifest itself to the remote computing systems as delayed, slow, unresponsive, or poor service on the part of the central computing system. Furthermore, the delayed repairs may result in damages or information compromises that could have otherwise been avoided or mitigated. Configuring a single central computing system to provide diagnostic and repair services to multiple remote computing systems may become impossible if the remote computing systems are affected or infected with malware that interferes with network communications for the remote computing systems.

What is needed is a method and system for distributing self-monitoring and self-healing capabilities to remote computing systems and/or to virtual assets.

SUMMARY

In accordance with one embodiment, a method and system for performing self-monitoring and self-healing operations from a virtual asset includes receiving, with a computing environment hosting the virtual asset, a first operating policy from an asset management computing environment, according to one embodiment. The virtual asset provides one or more computing services to one or more users, and the virtual asset includes an allocation of one or more hardware and software resources from the computing environment, according to one embodiment. The asset management computing environment parsed the first operating policy from a second operating policy and the first operating policy includes thresholds for the virtual asset, according to one embodiment. The method and system include receiving, with the computing environment, a library of repairs from the asset management computing environment, according to one embodiment. The method and system include detecting events, with the virtual asset, at least partially based on operational characteristics of the virtual asset exceeding at least one of the thresholds and repairing the virtual asset, with the virtual asset, using the library of repairs to return the virtual asset to the pre-determined state of operation, according to one embodiment.

A method and system for performing self-monitoring and self-healing operations within a virtual asset container includes receiving, with a first computing environment, a first operating policy from a second computing environment, according to one embodiment. The first computing environment includes the virtual asset container, and the virtual asset container includes a first plurality of virtual assets, according to one embodiment. The first plurality of virtual assets share one or more common characteristics, and the virtual asset container excludes a second plurality of virtual assets that lack the one or more common characteristics, according to one embodiment. Each of the first plurality of virtual assets includes an allocation of one or more hardware and software resources from the first computing environment, and the second computing environment parsed the first operating policy from a second operating policy, according to one embodiment. The first operating policy includes thresholds for the first plurality of virtual assets, according to one embodiment. The method and system include receiving, with the first computing environment, a library of repairs from the second computing environment, according to one embodiment. The method and system include detecting events, one of the first plurality of virtual assets, at least partially based on operational characteristics of the one of the first plurality of virtual assets exceeding at least one of the thresholds, according to one embodiment. The method and system include repairing the one of the first plurality of virtual assets, with the one of the first plurality of virtual assets, using the library of repairs to return the one of the first plurality of virtual assets to the pre-determined state of operation, according to one embodiment.

Figure 1:
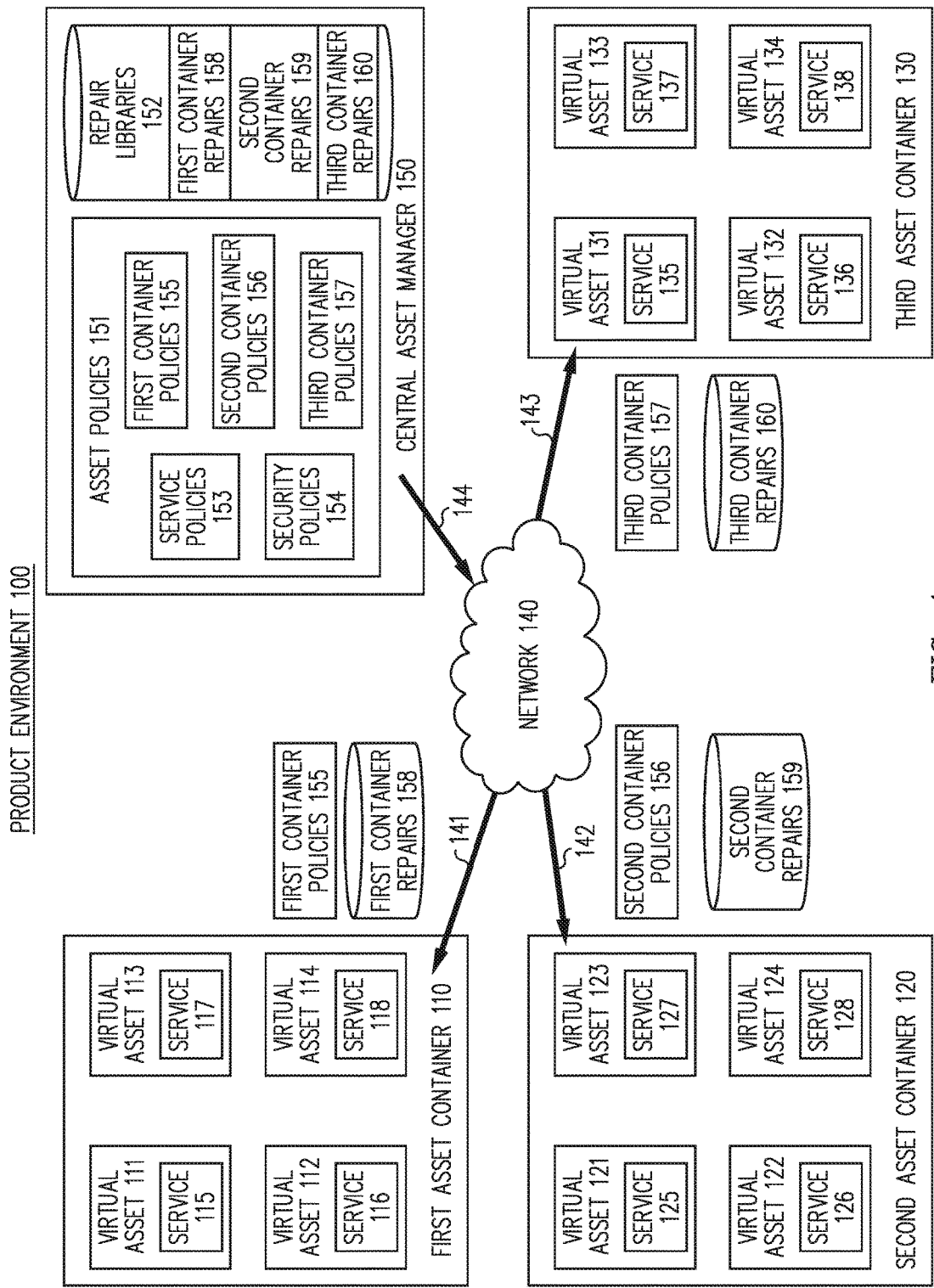
FIG. 1 is a block diagram of a hardware architecture for distributing self-diagnostic and self-healing capabilities to virtual assets, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, and PROCESS sections herein include systems and processes suitable for performing self-diagnostic and self-healing operations that are distributed to a virtual asset from a central asset manager, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party. Examples of trusted computing environments include the assets and components making up data centers associated with, and/or controlled by, an application and/or any computing systems and/or virtual assets, and/or networks of computing systems and/or virtual assets, associated with, known by, and/or controlled by, an application.

In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party. Examples of untrusted computing environments include, but are not limited to, public networks, such as the Internet, various cloud-based computing environments, and various other forms of distributed computing systems.

In various embodiments, each computing environment includes allocated assets and virtual assets associated with, and controlled or used to create, and/or deploy, and/or operate an application.

It is often the case that to create, and/or deploy, and/or operate an application, application data must be transferred between an untrusted computing environment and a trusted computing environment. However, in other situations a party may wish to transfer data between two trusted computing environments, and/or two untrusted computing environments.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

Typically, virtual assets are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. Illustrative examples of such a virtual asset creation template are any of the cloud formation templates/tools provided by Amazon Web Service (AWS), Rack Space, Joyent, and/or any other of the numerous cloud based infrastructure providers.

Other examples of virtual asset creation templates include, but are not limited to, any configuration management too associated with, and/or used to create, virtual assets. One specific illustrative example of such a virtual asset creation template is a cookbook or recipe tool such as a Chef Recipe or system or any other fundamental element, or set of elements, used to override the default settings on a node within an infrastructure or architecture.

Other examples of virtual asset creation templates include, but are not limited to, any virtual appliance used to instantiate virtual assets. One specific illustrative example of such a virtual asset creation template is an Amazon Machine Image (AMI), and/or similar functionality provided by Amazon Web Service (AWS), Rack Space, Joyent, and/or any other of the numerous cloud based infrastructure providers.

Other examples of virtual asset creation templates include, but are not limited to, any appliance, or tool, or system, or framework, used to instantiate virtual assets as discussed herein, and/or as known/available in the art at the time of filing, and/or as developed/made available after the time of filing.

Herein virtual assets that have the same, or similar, operational parameters and are created by the same or similar virtual asset creation template are generically referred to as virtual assets of the same "class." Examples of virtual asset classes include, but are not limited to, virtual machine classes; virtual server classes; virtual database or data store classes; self-monitoring virtual assets including specific types of instances instantiated in a cloud environment; application development process classes; and application classes.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "tenant" includes, but is not limited to, any user that enters a relationship, agreement, and/or contract, with an asset service provider or other service provider to receive an allocation of one or more assets or asset resources within an asset computing environment. In some embodiments, the terms "tenant" and "tenant computing environment" are interchangeably used even though, in some cases, a tenant represents a party, parties, or entities while the tenant computing environment represents one or more computing resources that are used by or that are at least partially under the control of the tenant.

Hardware Architecture

FIG. 1 illustrates a block diagram of a production environment 100 for distributing self-monitoring and self-healing operations to virtual assets by pre-deploying asset policies and repair libraries to the one or more virtual assets, according to one embodiment. The production environment 100 uses a central asset manager to determine and/or manage asset policies and repair libraries for the virtual assets of the production environment 100, according to one embodiment. The central asset manager distributes the asset policies and the repair libraries to the virtual assets to enable the virtual assets to self-heal any issues detected while self-monitoring, according to one embodiment. The virtual assets self-monitor, generate events in response to the self-monitoring, and self-heal themselves to restore the virtual assets to pre-event states, according to one embodiment.

There are various shortcomings associated with centralizing services for a distributed network of virtual assets. Examples of centralized services include virtual asset monitoring and virtual asset repair. As discussed previously, centralized services can result in service bottlenecks, and service bottlenecks can manifest themselves in a distributed service/network as delays in receipt of a service or as a denial to a requested service. In some instances, a virtual asset failure, issue, problem, or hiccup can disable the network communications for the virtual asset, in such a manner that the virtual asset becomes incapable of communicating with the centralized service provider. Without the capacity to establish a connection to a centralized service provider, a virtual asset may be unable to receive diagnostic and repair services needed to return the virtual asset to an operational state.

The production environment 100 addresses some of the shortcomings associated with centralized virtual asset services, e.g., monitoring and repairing services, by parsing rules and policies associated with virtual assets and distributing the parsed rules and policies to the virtual assets so that the virtual assets are capable of self-monitoring, according to one embodiment. The production environment 100 also parses repair libraries associated with virtual assets and distributes the parsed repair libraries to the virtual assets so that the virtual assets are capable of self-healing back to a known state of operation, according to one embodiment. The production environment 100 includes a first asset container 110, a second asset container 120, and a third asset container 130 for organizing, managing, and/or representing a set of virtual assets, according to one embodiment. The set virtual assets have a common function, type, geographic location, service, and/or other characteristic, according to one embodiment. Each of the asset containers 110-130, and their corresponding virtual assets are communicatively or operably coupled together with a network 140, according to one embodiment. A central asset manager 150 is also communicatively or operably coupled, through the network 140, to the asset containers 110-130, to manage, parse, and distribute asset policies and repair libraries to the asset containers 110-130 and/or to the virtual assets that constitute the asset containers 110-130, according to one embodiment.

The first asset container 110 organizes, manages, and/or represents a set of one or more virtual assets, according to one embodiment. The set of one or more virtual assets of the first asset container 110 have one or more common characteristics, such as function, type, geographic location, and service provided, according to one embodiment. The set of one or more assets of the first asset container 110 are of the same class and have the same, or similar, operational parameters, and/or are created by the same or similar virtual asset creation template, according to one embodiment. Examples of virtual asset classes include, but are not limited to, virtual machine classes; virtual server classes; virtual database or data store classes; self-monitoring virtual assets; application development process classes; and application classes, according to various embodiments. The first asset container 110 is a virtual private cloud that hosts the set of one or more virtual assets, according to one embodiment. The first asset container 110 can also be described as a virtual asset perimeter that represents physical and/or logical boundaries that are inclusive of some virtual assets and that are exclusive of other virtual assets, according to one embodiment. In some embodiments, the first asset container 110 organizes and/or represents a physical or logical grouping of a set of one or more virtual assets. In other embodiments, the first asset container 110 additionally manages the set of one or more virtual assets by instantiating new virtual assets, terminating existing virtual assets, monitoring the virtual assets for potential issues, and healing/repairing the virtual assets, as needed.

The first asset container 110 includes a virtual asset 111, a virtual asset 112, a virtual asset 113, and a virtual asset 114, according to one embodiment. Although four virtual assets 111-114 are associated with the first asset container 110, it is to be understood that the first asset container 110 can include more virtual assets or fewer virtual assets, according to other embodiments. The virtual assets 110-114 can generically be referred to as "first", "second", "third", and "fourth" virtual assets, according to one embodiment. The virtual assets 111-114 are an allocation of one or more hardware, software, and/or firmware resources to one or more tenants, according to one embodiment. The hardware, software, and/or firmware resources can be shared (e.g., allocated to or shared by multiple tenants), or the resources can be dedicated (e.g., allocated to a single tenant), according to one embodiment. The virtual assets 111-114 can include any virtualized entity or resource, and/or virtualized part of an actual, or "bare metal" entity. In various embodiments, the virtual assets 111-114 include, but are not limited to, one or more virtual machines; virtual servers; instances implemented in a cloud computing environment; databases associated with a cloud computing environment; databases implemented in a cloud computing environment; services associated with, and/or delivered through, a cloud computing environment; communications systems that are used with, part of, or provided through, a cloud computing environment; and/or any other virtualized assets and/or sub-systems of "bare metal" physical devices.

The virtual assets 111-114 include a service 115, a service 116, a service 117, and a service 118, respectively, according to one embodiment. The services 115-118 include one or more database services, application services, or other computing services, according to various embodiments. The services 115-118 can be private services that are restricted to the tenant of the virtual asset, can be public services that are available to one or more users, and/or can be asset services that are made available to one or more virtual assets or non-virtual assets associated with or represented by the asset containers 110-130, in one embodiment.

The second asset container 120 and the third asset container 130 include similar virtual asset configurations as the first asset container 110, according to one embodiment. The second asset container 120 includes virtual assets 121, 122, 123, 124, and the virtual assets 121-124 host or provide services 125, 126, 127, 128, according to one embodiment. The third asset container 130 includes virtual assets 131, 132, 133, 134, and the virtual assets 131-134 posts or provide services 135, 136, 137, 138, respectively, according to one embodiment. The first asset container 110, the second asset container 120, and the third asset container 130 represent virtual assets that are grouped or organized by class of operation, geographical location, type of service provided, operating system, or any other physical, logical, or functional characteristic, according to various embodiments.

The network 140 can include one or more communication channels 141, 142, 143, and 144 that enable the asset containers 110-130 and the central asset manager 150 to communicate information to one another, according to one embodiment. The network 140 can include, but is not limited to, a LAN, PAN, WAN, intranet, and the Internet, according to various embodiments.

The central asset manager 150 distributes self-monitoring and self-healing operations to virtual assets by pre-deploying asset policies 151 and repair libraries 152 to the virtual assets 111-114, 121-124, and 131-134, according to one embodiment. In other embodiments, the central asset manager 150 pre-deploys the asset policies 151 and the repair libraries 152 to the asset containers 110-130, to enable the asset containers 110-130 to apply the asset policies 151 and the repair libraries 152 to the virtual assets. The central asset manager 150 can be a computing environment or computing system that is configured to monitor the operations and overall health of the production environment 100, according to one embodiment. The central asset manager 150 can also include, host, or provide an administrative interface between the asset containers 110-130 and a systems administrator or other human resource, according to one embodiment.

The central asset manager 150 is configured to determine and/or manage the asset policies 151 and the repair libraries 152 for the virtual assets of the production environment 100, according to one embodiment. For example, the central asset manager 150 receives the asset policies 151 from human resources such as a systems administrator, security personnel, and/or one or more third party or external security consultants, according to one embodiment. Similarly, the central asset manager 150 receives and/or populates the repair libraries 152 based on input from human resources and/or based on information received from one or more third party databases, repositories, or service providers. In one embodiment, the central asset manager 150 populates the repair libraries 152 based on the rules and settings defined by the asset policies 151.

The asset policies 151 include service policies 153 and security policies 154, according to one embodiment. Some of the service policies 153 and security policies 154 apply globally to all virtual assets in the production environment 100, and others of the service policies 153 and security policies 154 apply to one or more particular virtual assets or one or more particular asset containers within the production environment 100, according to one embodiment.

The service policies 153 include policies for monitoring and maintaining operation of the virtual assets, according to one embodiment. Monitoring and maintaining operation of the virtual assets includes monitoring and maintaining resource allocation for the virtual assets, and monitoring and maintaining performance of the virtual assets. The service policies 153 include policies for virtual asset resource allocation and policies for virtual asset performance, according to one embodiment. The service policies 153 for virtual asset resource allocation determine minimum and/or maximum resource allocations for the operation of a virtual asset. The service policies 153 for virtual asset resource allocation include upper thresholds and lower thresholds of acceptable resource allocation parameters, e.g., amount of memory, speed of memory, physical type of memory, number of processors, types of processors, speed of processors, location of hardware, type of operating system, and version of operating system, according to one embodiment. The service policies 153 for virtual asset resource allocation are specific to the function, class, geographic location, type, or other characteristic of the virtual asset, according to one embodiment. Accordingly, the service policies for the virtual assets of the first asset container 110 can be different than the service policies for the virtual assets of the second asset container 120 and of the third asset container 130, according to one embodiment.

The service policies 153 for virtual asset resource allocation determine or define how to allocate resources to a newly instantiated virtual asset and are based on the type of virtual asset being instantiated, according to one embodiment. For example, the service policies 153 may require that a virtual asset that provides database services be allocated four computer processors, 50 GB of non-volatile memory, and 5 GB of volatile memory, according to one embodiment. As another example, the service policies 153 may require that a virtual asset that hosts an application, e.g., streaming video, be allocated eight computer processors, 2 TB of non-volatile memory, and 20 GB of volatile memory, according to one embodiment.

The service policies 153 for virtual asset resource allocation determine when the allocated resources of a virtual asset are insufficient, according to one embodiment. For example, if the non-volatile memory that is allocated to a virtual asset reaches 90% capacity, the service policies 153 for virtual asset resource allocation determines that the non-volatile memory is to be increased by, for example, 30%, according to one embodiment. As another example, if the virtual asset is allocated four medium-speed computer processors, the service policies 153 for the virtual asset resource allocation determines that the allocation is to be increased to six medium-speed computer processors if the computer processors operate above 80% max capacity for three or more consecutive days, according to one embodiment. In one embodiment, if one or more virtual asset instances are hosting the same application, the service policies 153 for virtual asset resource allocation determine that an additional virtual asset is to be instantiated with an additional instance of the application, if the combined traffic to the one or more virtual asset instances is greater than a first threshold, e.g., 90%, for longer than a second threshold, e.g., seven days.

The service policies 153 for virtual asset resource allocation determine when the allocated resources of a virtual asset are excessive, according to one embodiment. For example, if the non-volatile memory that is allocated to the virtual asset remains below 25% capacity for greater than 30 days, the service policies 153 for virtual asset resource allocation determines that the non-volatile memory is to be reduced by, for example, 50%. As another example, if the virtual asset is allocated six high-speed computer processors that operate at less than, for example, 50% of max capacity, the service policies 153 for virtual asset resource allocation determines that the allocation of computer processors be downgraded to medium-speed computer processors or that the allocation of computer processors be downgraded to four high-speed computer processors, according to one embodiment. In one embodiment, if multiple virtual asset instances are hosting the same application, the service policies 153 for virtual asset resource allocation determine that one of the virtual asset instances is to be terminated if combined traffic to the multiple virtual asset instances is less than a first threshold, e.g., 50%, for longer than a second threshold, e.g., 30 days.

In addition to including rules for virtual asset resource allocation, the service policies 153 include rules for virtual asset performance, according to one embodiment. Examples of virtual asset performance can include, but are not limited to, network speeds, responsiveness of service, user capacity, average processor capacity usage, and average memory capacity usage, according to one embodiment.

In addition to the service policies 153, the asset policies 151 include the security policies 154, for detecting and/or repairing the effects of security breaches, according to one embodiment. The security policies 154 are at least partially based on the type of the virtual asset, the function of the virtual asset, the geographic location of the virtual asset, the class of the virtual asset, or other characteristics of the virtual asset. For example, a virtual asset can provide private network services or public network services, so security settings or policies directed at one type of network service may not be pertinent to monitoring or governing the other type of network service. The security policies 154 can include, but are not limited to, rules and/or thresholds associated with quantity of traffic, traffic content (e.g., malware signatures), geographic origins of traffic, types of requests, frequency of requests, user account validation frequencies, user verification, frequencies of outgoing network messages, message destinations that are inconsistent with account records, failed login attempts, size of parameters received by a virtual asset, quantity of data in outgoing or incoming traffic, failure to perform one or more operations (e.g., failure to execute a security features update), according to various embodiments.

The central asset manager 150 parses the asset policies 151 into subsets that are convenient for delivery to the asset containers 110-130, according to one embodiment. The central asset manager 150 parses the asset policies 151 into first container policies 155, second container policies 156, and third container policies 157, according to one embodiment. In embodiments where the production environment 100 includes additional asset containers or fewer asset containers, the central asset manager 150 divides the asset policies 151 into correspondingly more or fewer subsets, for delivery to each of the asset containers in the production environment 100. In one embodiment, the central asset manager 150 parses the asset policies 151 into subsets that are relevant to particular virtual assets rather than into subsets that are relevant to particular asset containers. The central asset manager 150 determines which of the service policies 153 and which of the security policies 154 are relevant to each virtual asset and/or to each asset container. The central asset manager 150 then creates asset-specific or container-specific subsets of the asset policies 151, for delivery to the virtual assets or for delivery to the asset containers, according to one embodiment. According to one embodiment, each of the container policies 155-157 include all or part of the service policies 153 and/or all or part of the security policies 154.

The central asset manager 150 determines and maintains the repair library 152 for the virtual assets of the production environment 100, according to one embodiment. The repair libraries 152 include information, applications, code, data, properties, and settings for repairing and/or healing the virtual assets 111-114, 121-124, and 131-134, according to one embodiment. The repair libraries 152 repair and/or heal the virtual assets by restoring the virtual assets to a known state of operation, a default state of operation, and/or a functional state of operation, according to one embodiment. In one embodiment, the repair libraries 152 include software installation files, which can be used to reinstall one or more malfunctioning software programs or applications on a virtual asset. In one embodiment, the repair libraries 152 include application updates, which can be used to ensure that a reinstalled software program or application includes the most up-to-date fixes and security patches. In one embodiment, the repair libraries 152 include malicious software ("malware") repair files, which can be used to search for and destroy particular types of malware. In one embodiment, the malicious software repair files are maintained in a compressed and uninstalled format for pre-deployment to the virtual assets. Because the installation of potentially unnecessary software reduces processor and memory capacities, the malicious software repair files may be stored on a virtual asset until the virtual asset determines a need for malicious software repair, according to one embodiment. In one embodiment, the repair libraries 152 include software settings, which can be used to restore the settings of one or more software programs to a known state. In one embodiment, the repair libraries 152 include firewall rules and network properties, which enable the virtual asset to restore communications or restore network properties and firewall rules to an operational or to a known state.

The repair libraries 152 include repairs or fixes that are specific to a particular type or function of a virtual asset, according to one embodiment. For example, if the virtual asset provides a gateway service, the repair libraries 152 include network settings and firewall rules that repair the gateway service to a known or pre-determined state, according to one embodiment. If the virtual asset provides an application as a service, the repair libraries 152 include a copy of the installation file for the application so that the application can be reinstalled onto and/or by the virtual asset, according to one embodiment. If the virtual asset hosts a database service, the repair libraries 152 include a database installation file and an encrypted backup of the database from which the database can be restored, according to one embodiment.

The central asset manager 150 parses the repair libraries 152 into subsets that are convenient for delivery to the asset containers 110-130, according to one embodiment. The central asset manager 150 parses the repair libraries 152 into first container repairs 158, second container repairs 159, and third container repairs 160, according to one embodiment. In embodiments where the production environment 100 includes additional asset containers or fewer asset containers, the central asset manager 150 divides the repair libraries 152 into correspondingly more or fewer subsets, for delivery to each of the asset containers in the production environment 100. In one embodiment, the central asset manager 150 parses the repair libraries 152 into subsets that are relevant to particular virtual assets, rather than into subsets that are relevant to particular asset containers. The central asset manager 150 determines which of the repair libraries 152 are relevant to each virtual asset and/or to each asset container. The central asset manager 150 then creates asset-specific or container-specific subsets of the repair libraries 152, for delivery to the virtual assets or for delivery to the asset containers, according to one embodiment. According to one embodiment, each of the container repairs 150-160 include all or part of the repair libraries 152, in accordance with the type, function, class, or other characteristic of the virtual assets.

The central asset manager 150 distributes the asset policies 151 and the repair libraries 152 to the asset containers 110-134, or directly to the virtual assets 111-114, 121-124, and 131-134, to enable the virtual assets to self-heal issues, abnormalities, or events detected while self-monitoring, according to one embodiment. The central asset manager 150 distributes the first container policies 155 and the first container repairs 158 to the first asset container 110 and/or to the virtual assets 111-114, according to one embodiment. The central asset manager 150 distributes the second container policies 156 and the second container repairs 159 to the second asset container 120 and/or to the virtual assets 121-124, according to one embodiment. The central asset manager 150 distributes the third container policies 157 and the third container repairs 160 to the third asset container 130 and/or to the virtual assets 131-134, according to one embodiment. The central asset manager 150 can use any one of a number of techniques to distribute the asset policies 151 and the repair libraries 152 to the asset containers 110-130. For example, the central asset manager 150 can analyze the network 140 and the communication channels 141-144 and selectively distribute the asset policies 151 and the repair libraries 152 to the asset containers 110-130 using a minimum number of hops, using network resources having the greatest available bandwidth, and/or using network resources that are the most underutilized, according to various embodiments. In one embodiment, the central asset manager 150 uses one or more backdoor ports, proprietary communications protocols, or a backdoor daemon to securely distribute the asset policies 151 and the repair libraries 152 to the virtual assets. In one embodiment, the central asset manager 150 pre-deploys or pre-loads virtual assets with the asset policies 151 and the repair libraries 152 during the instantiation of a virtual asset, or shortly thereafter, to enable the virtual asset to initiate self-monitoring prior to providing services.

Upon receipt of the container policies 155-157 and the container repairs 150-160, the virtual assets and/or the asset containers are capable of self-monitoring and self-healing, independent of the central asset manager 150, according to one embodiment.

Figure 2:
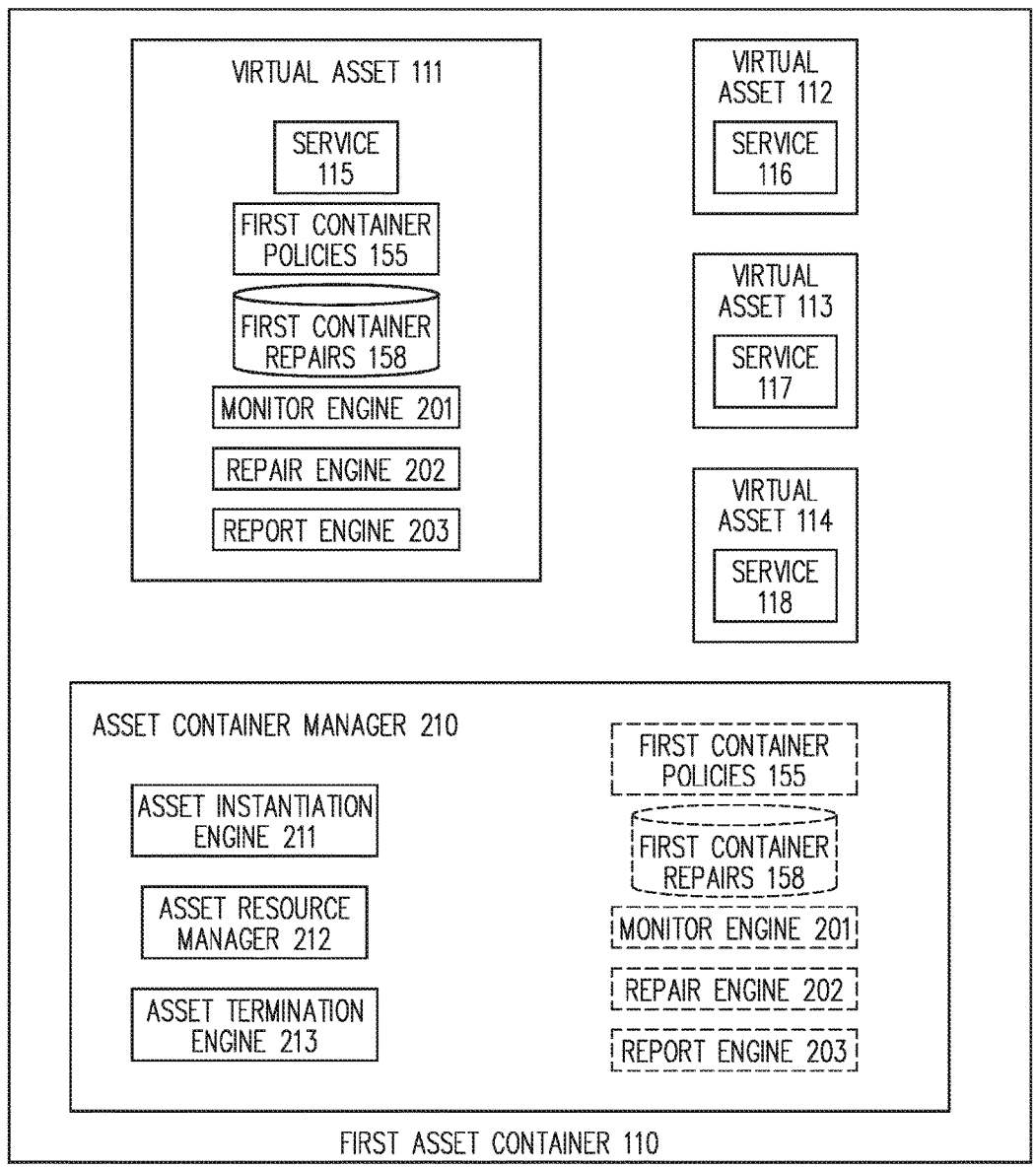
FIG. 2 is a block diagram of a virtual asset container, in accordance with one embodiment.

FIG. 2 illustrates a block diagram 200 of an implementation of the first asset container 110, according to one embodiment. Although more detail for the first asset container 110 is illustrated and described herein, the second asset container 120 and the third asset container 130 include similar features and similar functionality as the first asset container 110, according to one embodiment.

The virtual asset 111 receives the first container policies 155 and the first container repairs 158 from the central asset manager 150, as described above, according to one embodiment. The virtual asset 111 also includes a monitor engine 201, a repair engine 202, and a report engine 203, according to one embodiment. The monitor engine 201, the repair engine 202, and the report engine 203 can be received from the central asset manager 150 or can be installed in the virtual asset 111 during instantiation, according to various embodiments. The virtual asset 111 uses the monitor engine 201, the repair engine 202, and the report engine 203 to detect, remedy, and report events that are indicative of an unsatisfactory, undesirable, and/or changed states of the virtual asset, according to one embodiment.

The monitor engine 201 evaluates, analyzes, and monitors the operations of the virtual asset 111 to detect events, according to one embodiment. The events are based on and are defined by the rules or contents of the first container policies 155. The first container policies 155 set forth parameters, thresholds, limits, and/or expectations for the operations of the virtual asset 111. Events are defined as operations or characteristics of the virtual asset 111 that exceed, fall below, or otherwise diverge from the parameters, thresholds, limits, and/or expectations set forth by the first container policies 155, according to one embodiment. The monitor engine 201 receives the first container policies 155 and compares the operations and/or characteristics of the virtual asset 111 to the parameters, threshold, limits, and/or expectations from the first container policies 155 to detect whether or not any event has occurred, e.g., has been triggered, according to one embodiment. When the monitor engine 201 detects an event, the monitor engine 201 provides the repair engine 202 with identifiers, descriptions, parameters, and/or other information related to the event.

In various embodiments, one or more events can include, but are not limited to, one or more of: a network message from a virtual asset directed to a location known to be associated with malicious entities, i.e., a black-listed destination; the frequency of outgoing network messages changing to a level above a defined threshold level, i.e., the frequency of outgoing network messages changing to a level deemed "not normal"; a response to a customer request being directed to a destination that is not the customer location of record; a virtual asset receiving a high-frequency of login attempts that fail; a size of the parameters sent into a virtual asset being outside a defined "normal" range of sizes for parameters; a size of outgoing network messages being outside a defined "normal" range of sizes of outgoing messages; a total amount of data in any one communication connection of a virtual asset exceeding a defined maximum normal size of a communication to a customer; a request to a virtual asset coming in from a location known to be associated with malicious entities, i.e., a black-listed origin location; an internal elapsed time of defined critical operations changing to a time outside a defined range of "normal" values; and/or any other trigger event, or combination of trigger events, as discussed herein, and/or as known in the art at the time of filing, and/or as developed/made available after the time of filing.

The repair engine 202 uses the first container repairs 158 to self-heal the virtual asset 111, e.g., to return the virtual asset 111 to a known or pre-determined state, according to one embodiment. The first container repairs 158 are a portion of the asset policies 151 (shown in FIG. 1) that are relevant to the virtual asset 111, according to one embodiment. The repair engine 202 determines what aspect of the virtual asset 111 to fix or repair based on the information received in the event, e.g., from the monitor engine 201, according to one embodiment. The repair engine 202 retrieves one or more files, settings, properties, and/or updates from the first container repairs 158 and applies them to the virtual asset 111. In one embodiment, the repair engine 202 uninstalls the service 115 and reinstalls the service 115 based on an installation file stored in the first container repairs 158 to return the virtual asset to a known or pre-determined state. In one embodiment, the repair engine 202 replaces a first set of network properties, firewall rules, and/or software settings that are currently employed by the virtual asset 111, with a second set of network properties, firewall rules, and/or software settings that are stored in the first container repairs 158 to restore the virtual asset 111 to a known or pre-determined state, according to one embodiment.

In other embodiments, the repair engine 202 retrieves one or more files or instructions from the first container repairs 158 and takes one or more responsive actions based on the files or instructions. The responsive actions associated with the event can include, but are not limited to, any one or more of, requesting the detected event data no longer be sent; performing a scan of selected data within the virtual asset 111; obtaining data from the virtual asset 111; directing a transfer of data from within the virtual asset 111 to a location outside the virtual asset 111; closing down one or more communications channels used by the virtual asset 111; shutting down one or more capabilities of the virtual asset 111; aborting one or more operations performed by the virtual asset 111; destroying the virtual asset 111; generating and/or transferring incorrect and/or deceptive data from the virtual asset 111 to a location outside the virtual asset 111 associated with a malicious entity; and/or any other desired responsive actions, or combination of responsive actions, as discussed herein, and/or as known in the art at the time of filing, and/or as developed/become available after the time of filing.

In response to the monitor engine 201 detecting an event and/or in response to the repair engine 202 healing event, the report engine 203 transmits one or more reports identifying the event and/or the repair actions to the central asset manager 150 and/or to one or more system administrators or other human resources, according to one embodiment.

The asset container manager 210 can alternatively or additionally be configured to detect, repair, and report events that occur in the virtual asset 111, according to one embodiment. In one embodiment, the asset container manager 210 is installed in one or more of the virtual assets 111-114. In other embodiments, the asset container manager 210 is configured to detect, repair, and report events that occur within the first asset container 110, e.g., that occur within the virtual assets 111-114, according to one embodiment. Accordingly, the asset container manager 210 includes one or more of the first container policies 155, the first container repairs 158, the monitor engine 201, the repair engine 202, and the report engine 203, according to one embodiment.

In one embodiment, the asset container manager 210 manages the virtual assets 111-114 and supports the virtual assets 111-114 in repairing or healing the virtual assets 111-114. The asset container manager 210 is configured to receive the first container policies 155 and the first container repairs 158 and distribute the first container policies 155 and the first container repairs 158 to the virtual assets 111-114, according to one embodiment.

The asset container manager 210 includes an asset instantiation engine 211, and asset resource manager 212, and an asset termination engine 213, according to one embodiment. The asset container manager 210 uses the asset instantiation engine 211 to create new virtual assets within the first asset container 110, according to one embodiment. The asset container manager 210 uses the asset instantiation engine 211 to create new virtual assets within the first asset container 110 in response to events that result in a need for one or more additional virtual assets within the first asset container 110, according to one embodiment. The asset container manager 210 uses the asset instantiation engine 211 to create new virtual assets within the first asset container 110 in response to instructions to do so from the central asset manager 150, e.g., during the initial organization or creation of the first asset container 110, according to one embodiment.

The asset container manager 210 uses the asset resource manager 212 to adjust resource allocations for the virtual assets 111-114, according to one embodiment. For example, the asset container manager 210 uses the asset resource manager 212 to increase, add, decrease, remove, or otherwise modify resource allocations for the virtual assets 111-114 in response to events that result in a need or a trigger for modifying the resource allocations of one or more of the virtual assets 111-114, according to one embodiment. For example, if the monitor engine 201 determines that the resources allocated to the virtual asset 111 are operating above or below one or more pre-determined thresholds, the asset resource manager 212 increases and/or decreases resource allocations to return the operation of the virtual asset 111 to a known, predetermined, or more desirable state, according to one embodiment.

The asset container manager 210 uses the asset termination engine 213 to remove one or more virtual assets from the first asset container 110, according to one embodiment. For example, the asset container manager 210 uses the asset termination engine 213 to remove one or more virtual assets in response to events that indicate a surplus or an excess of resources allocated to one or more of the virtual assets 111-114, according to one embodiment. In other embodiments, the asset container manager 210 uses the asset termination engine 213 to fulfill requests from the central asset manager 150 to remove one or more virtual assets from the first asset container 110, according to one embodiment.

Process

Figure 3:
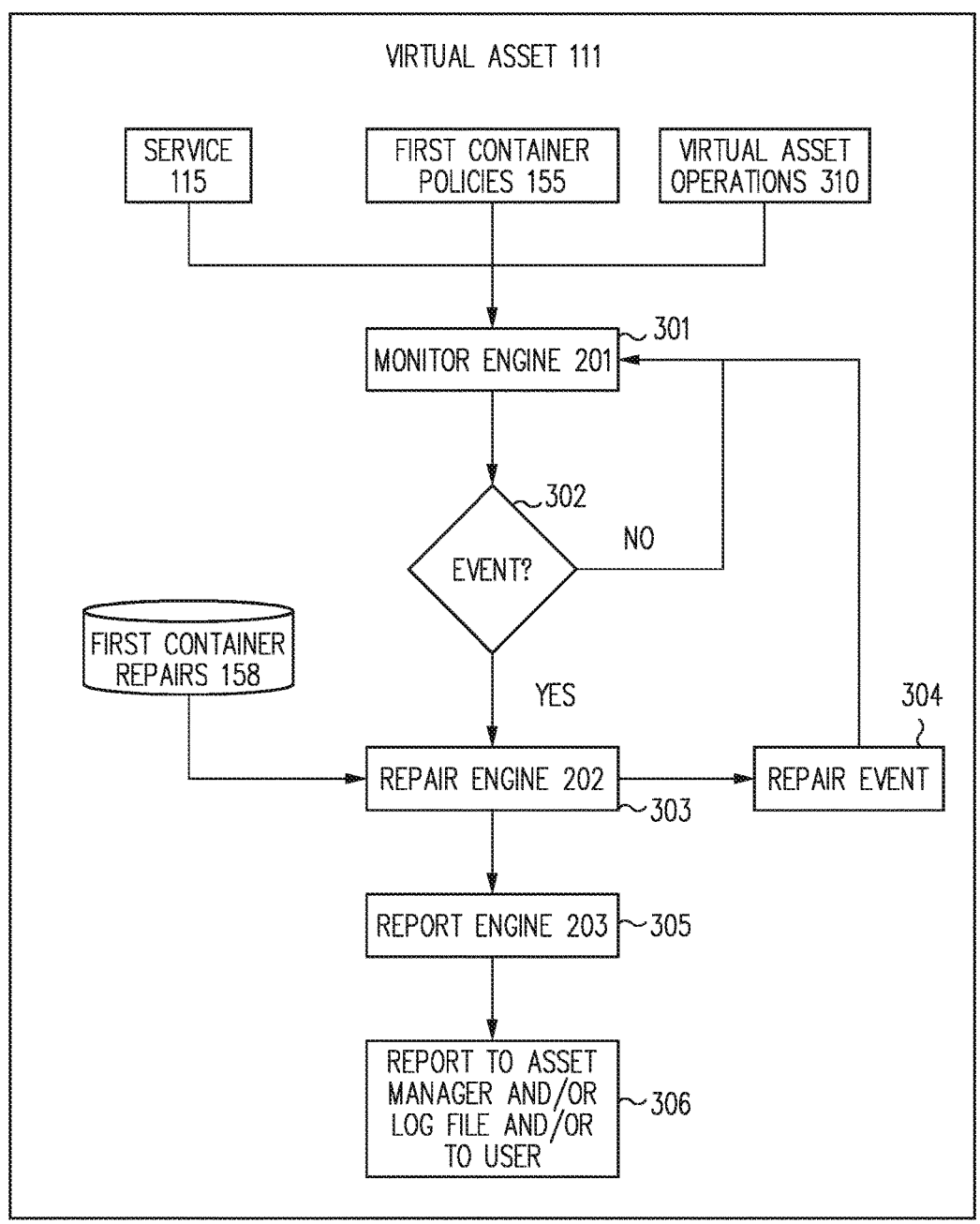
FIG. 3 is a flow diagram for performing self-monitoring and self-healing operations that have been distributed to a virtual asset, in accordance with one embodiment.

FIG. 3 illustrates a functional flow diagram of a process 300 for performing self-monitoring and self-healing operations that have been distributed to the virtual asset 111, according to one embodiment.

At block 301, the monitor engine 201 receives input from the service 115, the first container policies 155, and/or virtual asset operations 310, according to one embodiment. The virtual asset operations 310 can include, but are not limited to, remaining processor capacity, remaining memory capacity, quantity of traffic to the virtual asset 111, and frequency of traffic to the virtual asset 111, according to one embodiment.

At block 302, the process 300 determines whether an event has been detected, according to one embodiment. If an event has not been detected, the process 300 returns to block 301 to continue monitoring the virtual asset 111. If an event is detected, the process proceeds to block 303.

At block 303, the repair engine 202 receives event information and the first container repairs 158, according to one embodiment. The repair engine 202 maps the event with the repair for the event that is included in the first container repairs 158, according to one embodiment. The repair engine proceeds to block 304 and block 305 concurrently, according to one embodiment.

At block 304, the process 300 repairs the event, according to one embodiment. For example, the repair engine 202 applies one or more fixes contained in the first container repairs 158 to remove the characteristics of the virtual asset 111 that generated the event, according to one embodiment. The process proceeds to block 301.

At block 305, the report engine 203 receives information from the repair engine 202 regarding the type of event detected and/or the type of repair applied to the virtual asset 111, according to one embodiment.

At block 306, the process 300 reports the event and/or the repair to the central asset manager 150 and/or to a log file and/or to one or more system administrators or other human resources, according to one embodiment.

Figure 4:
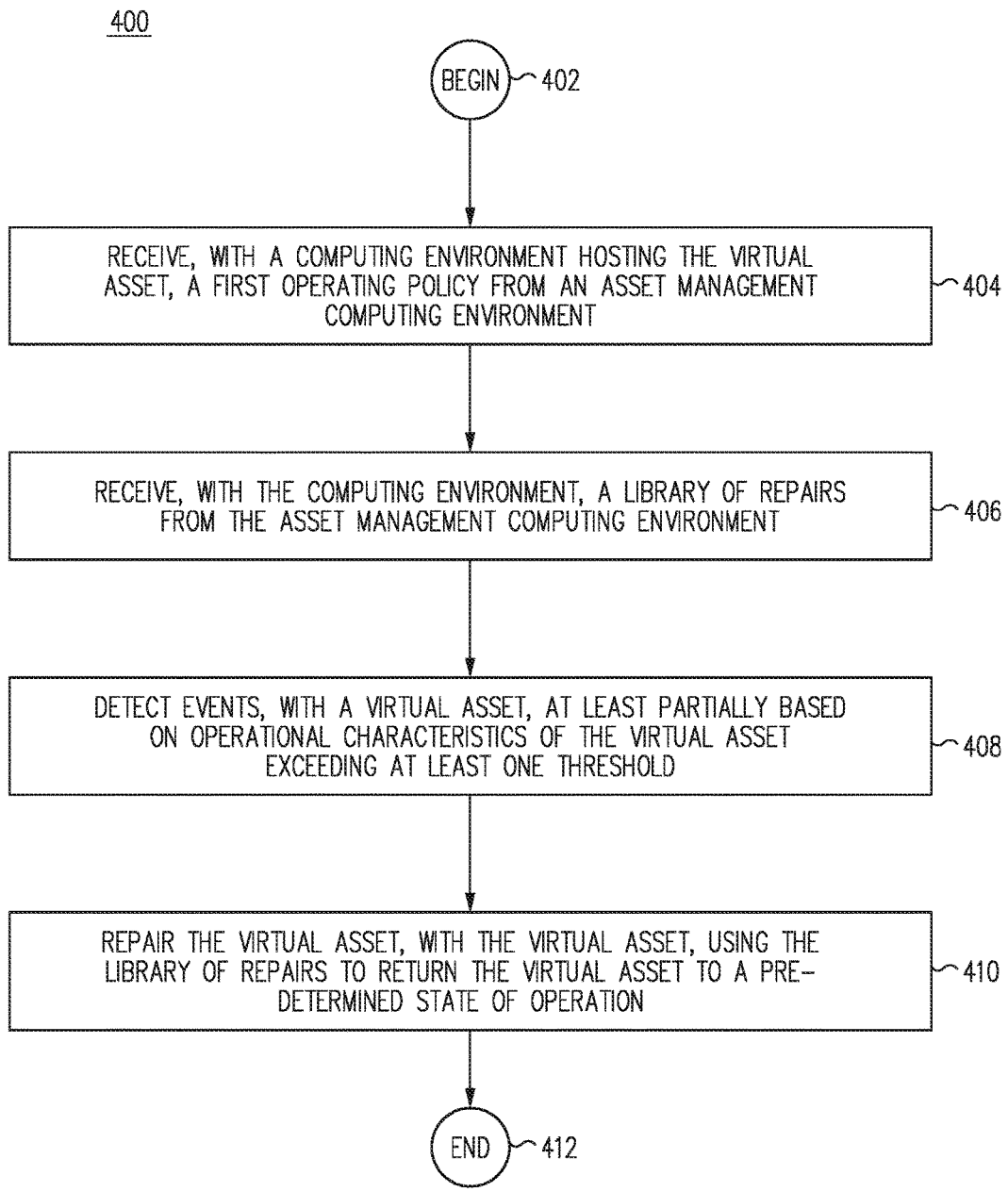
FIG. 4 is a flow diagram for performing self-monitoring and self-healing operations that have been distributed to a virtual asset, in accordance with one embodiment.

FIG. 4 illustrates a flow diagram of a process 400 for performing self-monitoring and self-healing operations that have been distributed to a virtual asset, according to various embodiments.

At block 402, the process begins.

At block 404, the process receives, with a computing environment hosting the virtual asset, a first operating policy from an asset management computing environment, according to one embodiment. The virtual asset provides one or more computing services to one or more users, and the virtual asset includes an allocation of one or more hardware and software resources from the computing environment, according to one embodiment. The asset management computing environment parsed the first operating policy from a second operating policy, and the first operating policy includes thresholds for the virtual asset, according to one embodiment.

At block 406, the process receives, with the computing environment, a library of repairs from the asset management computing environment, according to one embodiment.

At block 408, the process detects events, with the virtual asset, at least partially based on operational characteristics of the virtual asset exceeding at least one of the thresholds, according to one embodiment. The events represent a deviation of the virtual asset from a pre-determined state of operation, according to one embodiment.

At block 410, the process repairs the virtual asset, with the virtual asset, using the library of repairs to return the virtual asset to the pre-determined state of operation, according to one embodiment.

At block 412, the process ends.

As noted above, the specific illustrative examples discussed above are but illustrative examples of implementations of embodiments of the method or process for performing self-monitoring and self-healing operations that have been distributed to a virtual asset. Those of skill in the art will readily recognize that other implementations and embodiments are possible. Therefore the discussion above should not be construed as a limitation on the claims provided below.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for performing self-monitoring and self-healing operations from a virtual asset, comprising:
   receiving, with a computing environment hosting the virtual asset, a first operating policy from an asset management computing environment,
      wherein the virtual asset provides one or more computing services to one or more users,
      wherein the virtual asset includes an allocation of one or more hardware and software resources from the computing environment,
      wherein the asset management computing environment parsed the first operating policy from a second operating policy,
      wherein the first operating policy includes thresholds for the virtual asset;
   receiving, with the computing environment, a library of repairs from the asset management computing environment;
   detecting, through the virtual asset self-monitoring events affecting itself, events associated with the virtual asset the detection being at least partially based on operational characteristics of the virtual asset exceeding at least one of the thresholds,
      wherein the events represent a deviation of the virtual asset from a pre-determined state of operation; and
   repairing, through the virtual asset self-healing using the library of repairs, the virtual asset itself, to return the virtual asset to the pre-determined state of operation.

2. The method of claim 1, wherein the thresholds include at least one of a usage percentage of total computer processing capacity of the virtual asset, a usage percentage of total memory capacity of the virtual asset, a quantity of incoming traffic, a frequency of received requests, a quantity of outgoing traffic, and detection of a signature within incoming traffic that is associated with a potential security threat.

3. The method of claim 1, wherein the virtual asset is one of multiple virtual assets and the multiple virtual assets represent a virtual asset container,
   wherein each of the multiple virtual assets in the virtual asset container share at least one common characteristic.

4. The method of claim 3, wherein the common characteristic is at least one of a service provided, a geographic location, and a class of virtual asset.

5. The method of claim 4, wherein the class of virtual asset includes at least one of a virtual machine class, a virtual server class, a virtual database class, an application development process class, and an application class.

6. The method of claim 1, wherein the library of repairs includes one or more settings, files, and properties.

7. The method of claim 6, wherein the settings include software settings or default firewall settings.

8. The method of claim 6, wherein the files include at least one of an application installation file, and a malware repair file.

9. The method of claim 6, wherein the properties include network properties.

10. The method of claim 1, further comprising:
    monitoring the operational characteristics of the virtual asset, with the virtual asset.

11. The method of claim 1, wherein the library of repairs is a first library of repairs parsed from a second library of repairs by the asset management computing environment.

12. The method of claim 1, wherein the first operating policy includes rules for the virtual asset, wherein the rules for the virtual asset are specific to characteristics of the virtual asset.

13. The method of claim 1, wherein the library of repairs excludes repairs that are irrelevant to the virtual asset.

14. A computing system implemented method for performing self-monitoring and self-healing operations within a virtual asset container, comprising:
    receiving, with a first computing environment, a first operating policy from a second computing environment,
       wherein the first computing environment includes the virtual asset container,
       wherein the virtual asset container includes a first plurality of virtual assets,
       wherein the first plurality of virtual assets share one or more common characteristics,
       wherein the virtual asset container excludes a second plurality of virtual assets that lack the one or more common characteristics,
       wherein each of the first plurality of virtual assets includes an allocation of one or more hardware and software resources from the first computing environment,
       wherein the second computing environment parsed the first operating policy from a second operating policy,
       wherein the first operating policy includes thresholds for the first plurality of virtual assets;
    receiving, with the first computing environment, a library of repairs from the second computing environment;
    detecting, through a given virtual asset of the first plurality of virtual assets self-monitoring events affecting itself, events associated with the given virtual asset, the detection being at least partially based on operational characteristics of the given virtual asset exceeding at least one of the thresholds,
       wherein the events represent a deviation of the given virtual asset from a pre-determined state of operation; and
    repairing, through the given virtual asset self-healing using the library of repairs, the given virtual asset itself to return the given virtual asset to the pre-determined state of operation.

15. The method of claim 14, wherein the thresholds include at least one of a usage percentage of total computer processing capacity of the first plurality of virtual assets, a usage percentage of total memory capacity of the first plurality of virtual assets, a quantity of incoming traffic, a frequency of received requests, a quantity of outgoing traffic, and detection of a signature within incoming traffic that is associated with a potential security threat.

16. The method of claim 14, wherein the one or more common characteristics are at least one of a service provided, a geographic location, and a class of virtual asset.

17. The method of claim 16, wherein the class of virtual asset includes at least one of a virtual machine class, a virtual server class, a virtual database class, an application development process class, and an application class.

18. The method of claim 16, wherein first operating policy and the library of repairs is based at least partially on the one or more common characteristics.

19. A system for performing self-monitoring and self-healing operations from a virtual asset, the system comprising:
  at least one processor; and
  at least one memory coupled to the at least one processor, the at least one memory having stored therein instructions which, when executed by any set of the one or more processors, perform a process for performing self-monitoring and self-healing operations from the virtual asset, the process including:
    receiving, with a computing environment hosting the virtual asset, a first operating policy from an asset management computing environment,
      wherein the virtual asset provides one or more computing services to one or more users,
      wherein the virtual asset includes an allocation of one or more hardware and software resources from the computing environment,
      wherein the asset management computing environment parsed the first operating policy from a second operating policy,
      wherein the first operating policy includes thresholds for the virtual asset;
    receiving, with the computing environment, a library of repairs from the asset management computing environment;
    detecting, through the virtual asset self-monitoring events affecting itself, events associated with the virtual asset, the detection being at least partially based on operational characteristics of the virtual asset exceeding at least one of the thresholds,
      wherein the events represent a deviation of the virtual asset from a pre-determined state of operation; and
    repairing, through the virtual asset self-healing using the library of repairs, the virtual asset itself, to return the virtual asset to the pre-determined state of operation.

20. The system of claim 19, wherein the thresholds include at least one of a usage percentage of total computer processing capacity of the virtual asset, a usage percentage of total memory capacity of the virtual asset, a quantity of incoming traffic, a frequency of received requests, a quantity of outgoing traffic, and detection of a signature within incoming traffic that is associated with a potential security threat.

21. The system of claim 19, wherein the virtual asset is one of multiple virtual assets and the multiple virtual assets represent a virtual asset container, wherein each of the multiple virtual assets in the virtual asset container share at least one common characteristic.

22. The system of claim 21, wherein the common characteristic is at least one of a service provided, a geographic location, and a class of virtual asset.

23. The system of claim 22, wherein the class of virtual asset includes at least one of a virtual machine class, a virtual server class, a virtual database class, an application development process class, and an application class.

24. The system of claim 19, wherein the library of repairs includes one or more settings, files, and properties.

25. The system of claim 19, wherein the library of repairs is a first library of repairs parsed from a second library of repairs by the asset management computing environment.

26. The system of claim 19, wherein the first operating policy includes rules for the virtual asset, wherein the rules for the virtual asset are specific to characteristics of the virtual asset.

27. The system of claim 19, wherein the library of repairs excludes repairs that are irrelevant to the virtual asset.

28. A system for performing self-monitoring and self-healing operations within a virtual asset container, comprising:
  at least one processor; and
  at least one memory coupled to the at least one processor, the at least one memory having stored therein instructions which when executed by any set of the one or more processors, perform a process for performing self-monitoring and self-healing operations within the virtual asset container, the process including:
    receiving, with a first computing environment, a first operating policy from a second computing environment,
      wherein the first computing environment includes the virtual asset container,
      wherein the virtual asset container includes a first plurality of virtual assets,
      wherein the first plurality of virtual assets share one or more common characteristics,
      wherein the virtual asset container excludes a second plurality of virtual assets that lack the one or more common characteristics,
      wherein each of the first plurality of virtual assets includes an allocation of one or more hardware and software resources from the first computing environment,
      wherein the second computing environment parsed the first operating policy from a second operating policy,
      wherein the first operating policy includes thresholds for the first plurality of virtual assets;
    receiving, with the first computing environment, a library of repairs from the second computing environment;
    detecting, through a given virtual asset of the first plurality of virtual assets self-monitoring events affecting itself, events associated with the given virtual asset, the detection being at least partially based on operational characteristics of the given virtual asset exceeding at least one of the thresholds,
      wherein the events represent a deviation of the given virtual asset from a pre-determined state of operation; and
    repairing, through the given virtual asset self-healing using the library of repairs, the given virtual asset itself, to return the given virtual asset to the predetermined state of operation.

29. The system of claim 28, wherein the thresholds include at least one of a usage percentage of total computer processing capacity of the first plurality of virtual assets, a usage percentage of total memory capacity of the first plurality of virtual assets, a quantity of incoming traffic, a frequency of received requests, a quantity of outgoing traffic, and detection of a signature within incoming traffic that is associated with a potential security threat.

30. The system of claim 28, wherein the one or more common characteristics are at least one of a service provided, a geographic location, and a class of virtual asset.

31. The system of claim 30, wherein first operating policy and the library of repairs is based at least partially on the one or more common characteristics.

* * * * *